United States Patent [19]

Fowler

[11] Patent Number: 4,702,926
[45] Date of Patent: Oct. 27, 1987

[54] PROCESS FOR PRODUCING TWO-COMPONENT DOUGH PRODUCTS

[75] Inventor: David P. Fowler, Irving, Tex.

[73] Assignee: Frito-Lay, Inc., Dallas, Tex.

[21] Appl. No.: 376,729

[22] Filed: May 10, 1982

[51] Int. Cl.⁴ .......................... A21D 8/02; A23P 1/00
[52] U.S. Cl. ................................. 426/283; 425/112;
     425/398; 426/94; 426/512; 426/549
[58] Field of Search ............... 426/282, 283, 297, 302,
     426/512, 306, 94, 549; 99/353, 450.1; 425/112,
     115, 117, 324.1, 327, 256, 259, 261, 357, 358,
     359, 363, 364, 398, 436 R

[56] References Cited

U.S. PATENT DOCUMENTS

| | | | |
|---|---|---|---|
| 1,691,899 | 11/1928 | Paley | 425/195 |
| 1,841,494 | 1/1932 | Mears | 426/283 |
| 2,138,247 | 11/1938 | Tatosian | 426/283 |
| 2,158,910 | 5/1939 | Pellar | 425/328 |
| 2,713,833 | 7/1955 | Fay | 425/385 |
| 3,111,913 | 11/1963 | Mladek et al. | 99/353 |
| 3,689,280 | 9/1972 | Werner | 426/249 |
| 3,735,692 | 5/1973 | Marchignoni | 99/353 |
| 3,940,218 | 2/1976 | Steels | 425/112 |
| 4,002,773 | 1/1977 | Entenmann | 426/302 |
| 4,012,185 | 3/1977 | Poore et al. | 425/120 |

FOREIGN PATENT DOCUMENTS 466881  8/1975  U.S.S.R. ............... 425/398

OTHER PUBLICATIONS

Matz, Cookie and Cracker Technology, The AVI Pub. Co., Westport, Conn., 1968, (pp. 155–157).

Primary Examiner—George Yeung
Attorney, Agent, or Firm—Bernard, Rothwell & Brown

[57] ABSTRACT

A process is described for mechanized production of two-component dough products such as swirl cookies which includes forming an overall dough shape, embossing the top, filling the embossed area and ejecting the products onto a process conveyor.

13 Claims, 5 Drawing Figures

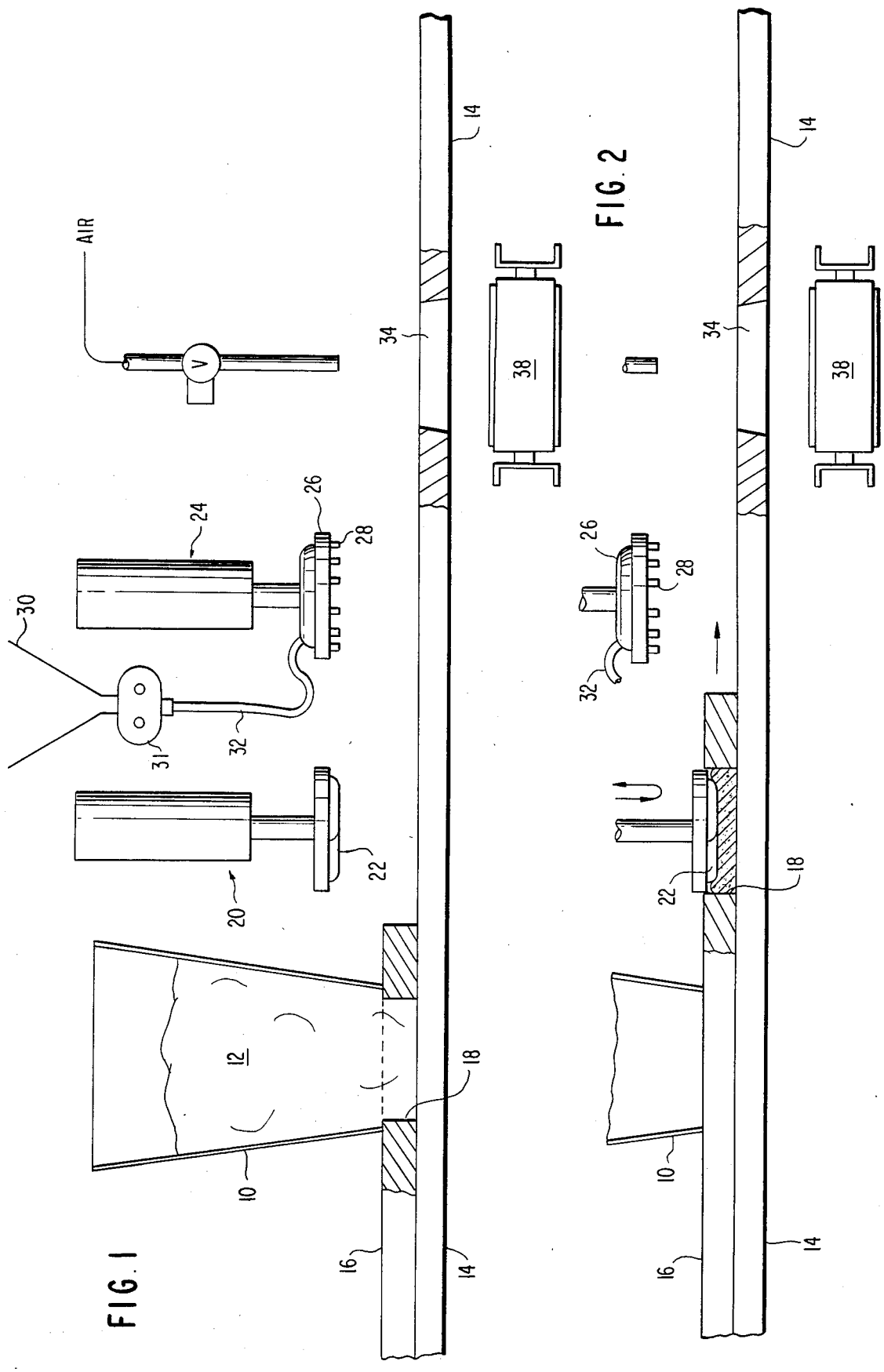

PROCESS FOR PRODUCING TWO-COMPONENT DOUGH PRODUCTS

BACKGROUND OF THE INVENTION

1. Field of The Invention

This application relates to an automatic process and apparatus for producing two- (or more) component edible dough products such as cookies or other snack foods.

2. Prior Art

Component dough products having two or more components are popular with consumers but their production is often time-consuming and, therefore, relatively expensive. Swirl cookies, for instance, which have dough as a principal component and chocolate icing or some other suitable filling combined with the dough to form a swirl pattern with the dough, are typically made by rolling the dough out on a flat surface and spreading the chocolate icing or other flavored component on the flat dough surface. The dough is then rolled into an elongated tube shape which results in the layers of dough and icing being intertwined. The dough and icing, rolled together into a tube shape, are then cut by a knife or wire vertically along the longitudinal axis of the tube to produce uniform cookie-shaped segments which are then cooked to provide an end product having the desired two-component swirl design.

SUMMARY OF THE INVENTION

This invention produces a multi-component dough product by a unique process which comprises depositing dough in a mold, embossing the dough in the mold to form an impression, filling the impression with an edible second component to form a two-component dough product and then depositing the two-component dough product on a conveyor.

BRIEF DESCRIPTION OF THE DRAWINGS

FIG. 1 is a schematic illustration of the apparatus of this invention and illustrates the invention wherein the process is in a first stage.

FIG. 2 is similar to FIG. 1 but illustrates the invention at a second stage.

DETAILED DESCRIPTION OF THE PREFERRED EMBODIMENT

Figure 5:
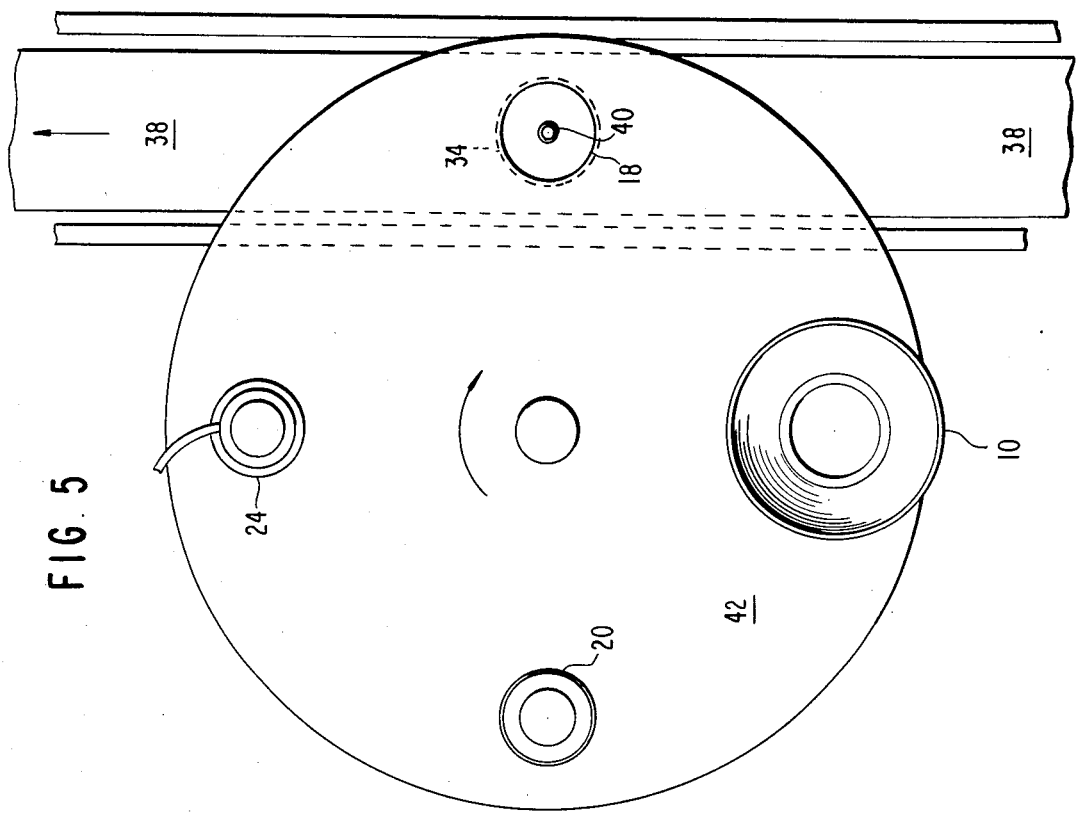
FIG. 5 is a top plan view of the apparatus of the invention embodied in a rotary mechanism.

One embodiment of the process is illustrated in FIGS. 1, 2, 3 and 4. As illustrated in FIG. 1, a hopper 10 is provided which is filled with dough 12. A stationary support plate 14 is positioned beneath the hopper 10 and extends longitudinally to support a movable plate 16 through the steps of the process.

Movable plate 16, having a mold cavity 18, is positioned above the support plate with the mold cavity immediately below the hopper 10. In this manner, support plate 14 forms a bottom for the mold cavity 18. At the first stage of the process, illustrated in FIG. 1, mold cavity 18 is filled with dough from the hopper 10. The dough is forced out of the hopper into the mold cavity by pressure applied to the top of the mass of dough in the hopper. This force may be applied by air pressure, by a hydraulically-operated piston mechanism or by any other suitable device for applying pressure to the top of the mass of dough in the hopper to insure that each mold cavity is filled with an appropriate, measured quantity of dough.

After the mold cavity 18 is filled with dough, the movable upper plate moves step-wise to the next stage of the process illustrated in FIG. 2. At the second stage of the process, an embosser 20 moves vertically downward when the mold 18 containing dough is in position directly beneath the embosser. The embosser 20 is provided with a pattern-shaped head 22 which engages the dough to form an impression in the dough. After the embosser has engaged the dough it moves vertically upward leaving an impression in the dough corresponding to the shape of the head 22. After the impression has been made in the dough, the movable upper plate steps again, shifting the mold 18 containing dough with an impression formed therein to the third stage of the process illustrated in FIG. 3.

Figure 3:
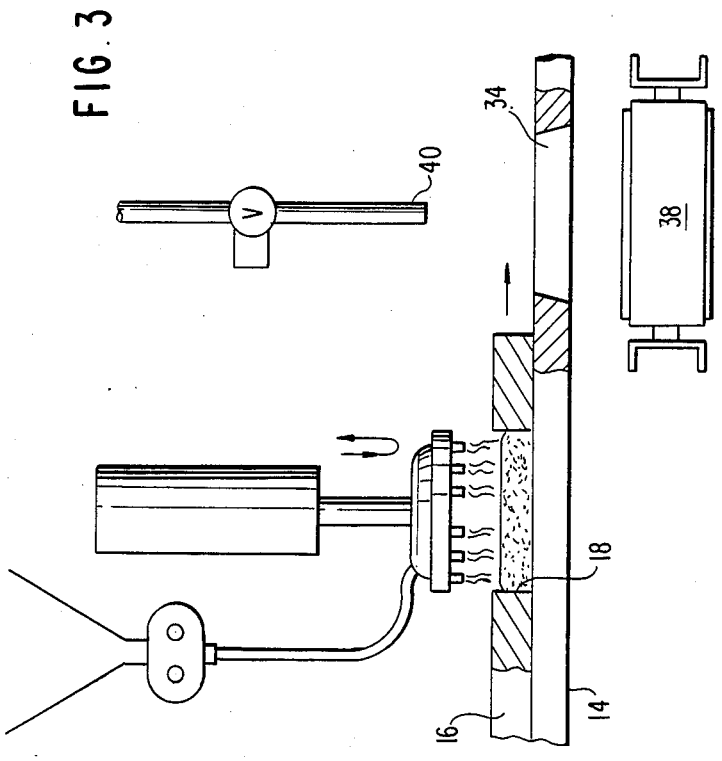
FIG. 3 illustrates the process in a third stage.

At the third stage of the process, the impression formed in the dough at the second stage of the process is filled with a second component of edible material. This may be accomplished by a filling mechanism 24 as illustrated in FIG. 3. The filling mechanism (see FIG. 1) includes a head 26 having a nozzle, or preferably a series of nozzles, 28, which are arranged to correspond to the shape of the impression made in the dough by the embosser head 22. The filling device 24 is provided with a supply of material for use as a second component, for instance chocolate icing, from supply bin 30 through supply line 32. The supply bin 30 is provided with a pressure-producing mechanism or pump 31 to force the edible material used as a second component out of the bin 30 through line 32 and into embosser head 26. The pressure developed to force the second component through the bin and supply line into the head forces the material through nozzles 28. The quantity of material forced through filler head 26 and into each impression is governed by a piston mechanism or other standard equipment. After the impression has been filled, the filler head moves upward and the upper movable plate 16 moves or steps laterally to the next stage of the process.

Figure 4:
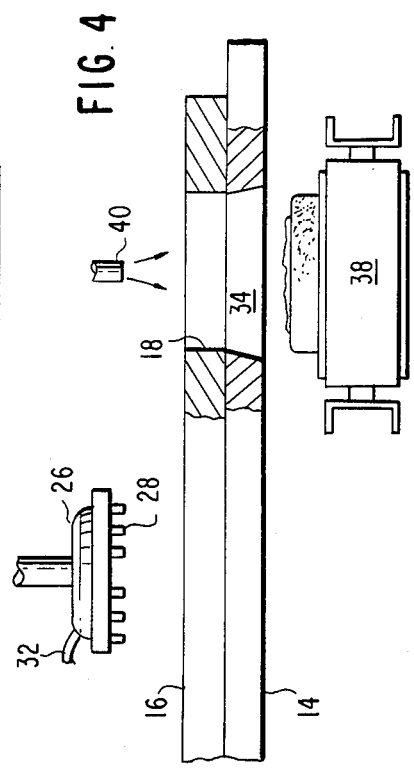
FIG. 4 illustrates the process in a fourth stage wherein the product is deposited onto a conveyor.

The last stage of the process is illustrated in FIG. 4 where the mold 18 is illustrated positioned over an opening 34 in support plate 14. As the mold 18 moves over the opening 34 in support plate 14, the dough product 36 moves downward through opening 34 onto a conveyor 38. The downward movement of the dough product may be assisted by air pressure supplied from line 40 or by any other suitable mechanism for forcing the dough product through the opening 34. Such downward pressure may be required to overcome adherence of the dough product to the interior walls of the mold cavity. The conveyor 38 then moves the dough product to a cooking station where the product is baked in a conventional manner.

As will be appreciated from the foregoing description, the process of this invention comprises depositing dough in a mold, embossing the dough in the mold to form an impression, filling the impression with an edible second component to form a two-component dough product and finally depositing the two-component dough product on a conveyor. Those skilled in the art of making dough products will recognize that products having more than two components could be produced by this invention by altering the steps described above in obvious ways. For instance, a three-component product could be provided by using two filling devices rather than one. One filling device could fill half of the impression formed by the embosser with a particular filling, while the second filling device could fill the remaining half of the impression formed by the embosser with a different filling.

Although FIGS. 1, 2, 3 and 4 illustrate the invention with equipment arranged longitudinally in a line, the equipment could be arranged in a circular manner as illustrated in FIG. 5.

In FIG. 5, dough hopper 10, embosser 20, filling device 24 and ejecting mechanism 40 are arranged in a circular manner with respect to one another. A mold plate 42 and the underlying support plate (not shown) form a circle under the apparatus involved in performing the separate steps of the process. As the upper movable mold plate rotates 42 in the direction shown in FIG. 5, the mold 18 moves from one station to the next until it reaches the ejection station where the two-component dough product again moves downward through an opening 34 provided in the underlying support plate onto a conveyor 38. The conveyor then moves in the direction shown or in the opposite direction, to take the two-component dough product to a baking station. Whether a circular or linear arrangement of equipment is used, the mold cavities are positioned under the dough hopper, embosser, filler and over the opening with sufficient accuracy to enable the production of a uniform final product having at least two components in a time- and labor-efficient manner.

A number of other features of the invention described above could be altered without departing from applicant's invention. For instance, the conveyor could be a segmented device as illustrated in FIGS. 1 through 4 or it could be a continuous belt made of suitable material for moving the dough products to the baking area. In addition, it will be appreciated by those skilled in the art that many mold cavities would preferably be provided in the upper movable plate to enable continuous, rapid production of the desired two-component product.

I claim:

1. A process for producing a multicomponent dough product, wherein dough is a first component, comprising:
    (a) depositing a measured quantity of dough in a product forming mold cavity to fill said cavity with dough;
    (b) embossing said dough in said mold to form an impressed pattern within said dough;
    (c) filling said impressed pattern by applying to the impressed pattern a measured quantity of an edible second component in the shape of said pattern, to form a dough product;
    (d) removing said dough product.

2. A process for producing a multicomponent dough product wherein dough is a first component comprising:
    (a) depositing a measured quantity of dough in a mold cavity to fill said cavity with dough;
    (b) step-wise moving said mold cavity to a position at an embossing station;
    (c) embossing said dough to form an impressed pattern within said dough for receiving a measured quantity of an edible second component;
    (d) step-wise moving said mold cavity to a position at a filling station;
    (e) filling said impressed pattern in said embossed dough by applying to the impressed pattern a measured quantity of an edible second component in the shape of said pattern;
    (f) step-wise moving said mold cavity to a position over an opening; and
    (g) ejecting said product from said mold cavity.

3. A process as recited in claim 2 wherein said second component is a flavored icing.

4. A process as recited in claim 1 wherein said pattern is a swirl.

5. A process as recited in claim 2 wherein said pattern is a swirl.

6. A process as recited in claim 3 wherein said pattern is a swirl.

7. A process for producing a multi-component dough product, wherein dough is a first component, comprising:
    (a) depositing a measured quantity of dough in a product forming mold cavity to fill said cavity with dough;
    (b) embossing said dough in said mold to form an impressed swirl pattern within said dough;
    (c) filling said impressed swirl pattern by applying to the impressed swirl pattern a measured quantity of an edible second component in the shape of said swirl pattern, to form a dough product; and
    (d) removing said dough product.

8. A process for producing a multi-component cookie, comprising:
    (a) depositing a measured quantity of cookie dough in a cookie-forming mold cavity to fill said cavity with dough;
    (b) embossing said cookie dough in said mold to form an impressed pattern within said cookie dough;
    (c) filling said impressed pattern by applying to the impressed pattern a measured quantity of an edible second component in the shape of said impressed pattern, through a nozzle arrangement shaped to correspond to the impressed pattern, to form a cookie dough product; and
    (d) removing said cookie dough product.

9. A process as recited in claim 8 wherein said nozzle arrangement is comprised of one nozzle.

10. A process as recited in claim 8 wherein said nozzle arrangement is comprised of a plurality of nozzles.

11. A process as recited in claim 8 wherein said pattern is a swirl.

12. A process as recited in claim 9 wherein said pattern is a swirl.

13. A process as recited in claim 10 wherein said pattern is a swirl.

* * * * *